United States Patent
Wallers

(10) Patent No.: US 7,177,800 B2
(45) Date of Patent: Feb. 13, 2007

(54) METHOD AND DEVICE FOR THE PROCESSING OF SPEECH INFORMATION

(75) Inventor: Joseph Wallers, Berlin (DE)

(73) Assignee: digital design GmbH, Berlin (DE)

( * ) Notice: Subject to any disclaimer, the term of this patent is extended or adjusted under 35 U.S.C. 154(b) by 929 days.

(21) Appl. No.: 09/985,430

(22) Filed: Nov. 2, 2001

(65) Prior Publication Data
US 2002/0082841 A1  Jun. 27, 2002

(30) Foreign Application Priority Data
Nov. 3, 2000  (DE) ................................ 100 54 583

(51) Int. Cl.
*G10L 19/00* (2006.01)

(52) U.S. Cl. ........................ 704/201; 704/235; 704/270

(58) Field of Classification Search ................ 704/201, 704/270, 270.1, 235, 260, 2, 4, 1, 9; 707/1–5; 369/44.28, 53.24
See application file for complete search history.

(56) References Cited

U.S. PATENT DOCUMENTS

| | | | | |
|---|---|---|---|---|
| 4,829,576 A | | 5/1989 | Porter | |
| 4,905,288 A | * | 2/1990 | Gerson et al. | 704/245 |
| 4,985,863 A | * | 1/1991 | Fujisawa et al. | 707/5 |
| 5,602,963 A | * | 2/1997 | Bissonnette et al. | 704/275 |
| 5,717,914 A | * | 2/1998 | Husick et al. | 707/5 |
| 6,041,300 A | | 3/2000 | Ittycheriah et al. | |

FOREIGN PATENT DOCUMENTS

DE  33 33 958 A1  4/1985

* cited by examiner

*Primary Examiner*—Vijay B. Chawan
(74) *Attorney, Agent, or Firm*—Birch, Stewrt, Kolasch and Birch, LLP

(57) ABSTRACT

A method and a device for processing of speech information uses the input and/or storage and/or the acoustical reproduction and/or for the transmission of speed and data information to other devices for local storage and/or reproduction, as well as searching for one or several speech segments in the stored speech information. A recording and search/reproduction of speech information is ensured without manual designation and classification and without the requirement of a vocabulary. Spoken words and/or correlated sentences (memorandums) are digitally recorded as speech signals in a memory which, in a partial scope of at least one word, are again spoken for search purposes and are compared in a device with the recordings and subsequently evaluated, from which a score between the two speech patterns is determined and the memorandum with the smallest score is issued/reproduced acoustically.

25 Claims, 1 Drawing Sheet

METHOD AND DEVICE FOR THE
PROCESSING OF SPEECH INFORMATION

FIELD OF THE INVENTION

The invention concerns a method and a device for the processing of speech information for the realisation of a memory based on speech such as the storage and/or reproduction and/or transmission which have means for the input and/or storage and/or the acoustical reproduction and/or for the transmission of speech and data information to other devices for local storage and/or reproduction, as well as containing means for searching for one or several speech segments in the stored speech information.

DESCRIPTION OF THE BACKGROUND ART

Methods and devices are known, with which it is possible to store speech information where the stored speech information is provided with digital identification signal words in order to facilitate the retrieval of certain speech information for reproduction or for transmission purposes.

In the patent specification DE 33 33 958 A1 a device is described for the storage of speech information which contains a controllable generator through which digital identification signal words are produced by means of a keyboard. These are recorded with or separately from the speech information and used for a later search for the retrieval of the information as required.

It is a disadvantage for the user because he has to classify the speech information in order to be able to start a search operation for certain speech information.

In the U.S. Pat. No. 5,602,963 a electronic personal organiser is described which is capable of recording and reproducing voice messages. The organiser also has a function which allows the user, following the recording of a voice message, to be able to mark this by means of an input of one or several spoken words for retrieval at a later date.

This approach has the disadvantage in that for each voice message, provided a classification is desired, the classification must be explicitly carried out by the user after the recording of the message. The amount of words, which can be searched for, must be specified beforehand. These words must be pre-spoken beforehand in a training phase. The processing of the speech signals in the organiser is effected by means of various processing functions, depending on whether the speech is to be recorded or compared with a pre-specified vocabulary.

In the U.S. Pat. No. 4,829,576, and for the purpose of increasing the probability for the correct recognition of a word, it is proposed that only those words are to be adopted for comparison from the specified vocabulary which are contained in the text part to be searched. For this purpose, a SEARCH WORD LIST is formed in a separate step.

In the U.S. Pat. No. 6,041,300 a method and a device are described, according to which and for the purpose of improving the speech selection, the speech is to be transformed in a sequence of lefemes, which is compared with the previously stored lefeme-sequences. The recognised word, for conformation by the user, is synthesised from the stored sequence of lefemes in the database and issued.

A disadvantage here, in particular, is the fact that the establishment of a database is necessary as a first step.

BRIEF SUMMARY OF THE INVENTION

The task assignment of the invention is to develop a generic method and a generic device with which the disadvantages of the state of the art are avoided and with which a memory assistance based on speech is made available, and with which a recording and search/reproduction of speech information is ensured without manual designation and classification and without the requirement of a vocabulary.

The method is characterised in that spoken words and/or correlated sentences are digitally recorded as speech signals of the memorandum in a memory, where an analysis of the speech signals and their direct representation take place in the time and/or frequency-domain which, in a partial scope of at least one word for searching, are spoken again and are compared with the recordings and evaluated, from which a score between both speech patterns is determined and the memorandum with the smallest score is acoustically issued.

Compared with speech recognition systems, the user has a greater tolerance with regard to errors during classification. The speaker dependency is not a disadvantage during the search process, but is instead a pleasant side-effect with regard to confidentiality.

There is no explicit assignment of speech memorandums to certain words by the user. The vocabulary does not have to be explicitly established. A training phase is not required.

The device for executing the method is characterised in that a telecommunication terminal equipment unit such as a mobile phone/telephone is used which is equipped with a memory card such as FlashROM and/or a data processing facility such as a PC, a server with a special additional software.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing, which is given by way of illustration only, and thus is not limitative of the present invention, and wherein:

The FIGURE shows a schematic illustration of a possible communication configuration of the present invention.

DETAILED DESCRIPTION OF THE INVENTION

Figure 1:
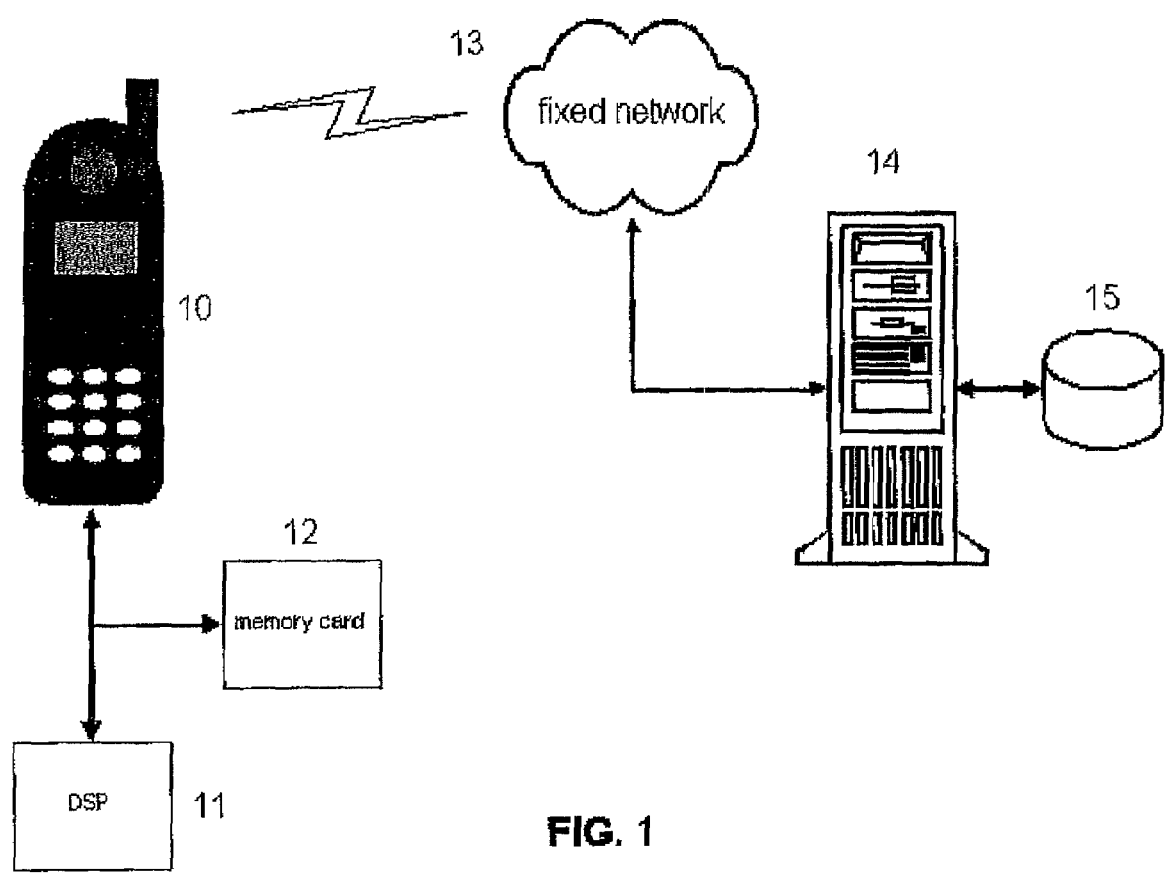

The basic functions of the method and the device according to this invention can be described by two operations: recording and search/reproduce.

During the recording process, memorandums in the form of single, spoken keywords such as terms, names, numbers or connected sentences are recorded, keywords whose retrieval is of particular interest to the user, can be spoken several times by him with any one memorandum. The recording can be done in the device (equipment unit), such as on a memory card installed in a mobile phone or also by means of a speech/data transmission on a remote equipment unit such as a server or a PC.

For the search operation, the user audibly speaks the search words such as names etc. In the device itself (mobile phone, for example) or in the other remote equipment unit (server or PC) the spoken speech patterns are compared with the stored speech information and evaluated with regard to their similarity and/or a score between both speech patterns is determined. The memorandums with the greatest degree of similarity (lowest score) are then acoustically reproduced. In the event of several findings, the reproduction can take place in the successive order of the recording (e.g., last recordings at first place) or according to similarity of searched speech pattern and stored speech information. Search commands can contain one or several keywords. Where several keywords are concerned, the search can be performed for memorandums containing one, several or all of the keywords.

In a preferred embodiment the memorandums are first reproduced which contain the highest number of searched keywords.

In a preferred embodiment of the invention, the speech signals are recorded in a compressed manner.

In practice, a series of methods for speech compression are known, such as the Recommendations G.723 or G.729 of the ITU (International Telecommunication Union) or the Recommendation GSM 06.10 of ETSI. These methods work on a multiple stage basis. After a pre-processing by means of a filter, there is then the subdivisioning in segments and a signal analysis, e.g., by means of LPC (Linear Predictive Coding). The segments determined in this case (speech/speech interval, voiced/voiceless) and the calculated parameters (e.g., energy content, the auto-correlation coefficients, the LPC coefficients, the LSP Line Spectral Pair coefficients and parameters of further processing stages) are also suitable for the comparison of speech patterns. The analysis of the speech with these methods and the compressed storage reduce the required storage space compared with the non-compressed storage. At the same time, the pattern comparison later is accelerated.

A further embodiment of the invention also stores non-compressed signals in addition to the compressed speech information.

The purpose of this approach is to be in a position to apply more improved algorithms at a later date in time. The recorded speech information can be required over a longer period of time (decades). Where a speech compression is concerned, detail information is inevitably lost. Performance capacity of the information processing equipment as well as the quality of the algorithms to the pattern comparison are most likely to be continually developed further. For this reason, the original signals should be retained for later use. The further continual capacity increase, as to be expected, (with a drop in price at the same time) of the storage media makes this option affordable for the user.

Likewise, it is also possible according to the invention, to state during input which part of the speech information is to be also stored non-compressed. The non-compressed signals can also be filed on another memory, an offline memory.

The method also allows the execution of a hidden search. If, during a search operation, a speech memorandum has been found where the comparison of the speech patterns of the search command and speech patterns of the memorandum exceed a pre-specified threshold, this is reproduced. During the reproduction process, the search is conducted further in the background. The time involved for searching is, by this means, partially hidden from the user.

In a further embodiment, the speech patterns of the keywords contained in the search commands, the pointers on the speech memorandums found, the calculated scores and the reaction of the user are also stored. In this embodiment, it is assumed that the user performs an evaluation after reproduction of a memorandum: GOOD, WRONG. This reaction together with the pointers to a reproduced memorandum is also stored. With a new search command, the current speech patterns of the search command are compared with the speech patterns of former search operations. If the patterns coincide with one another or in the event of great similarity, the stored former reaction of the user is checked out and, provided it is positive, the memorandum to which the pointer of the recording of the former search command shows, is reproduced. The subsequent reaction of the user is again stored with the pointer to the reproduced memorandum. This approach has some advantages:

It shortens the searching operation;

The hit accuracy increases continually;

Gradual changes in the pronunciation or in the voice of the user are compensated;

The stored speech patterns and evaluations of decisions can be used for optimising the process;

The search-through of the original memorandums is furthermore possible.

Furthermore, it is also possible according to the invention, after the indirect search and by means of the pointer of a previous search command, to compare the speech patterns of the new search command with the speech patterns of the recorded memorandum and to use the result for determining the score.

Likewise, it is also possible according to the invention to have a more precise classification of the evaluations: e.g., COMPLETELY WRONG, VERY GOOD A COMPLETELY-WRONG evaluation then definitely blocks a reproduction of the corresponding memorandum during a later search operation. A WRONG-evaluation puts back the memorandum in the order of succession of the candidates, e.g. whereby its score is increased by multiplication with a factor greater than one. Correspondingly, for a VERY GOOD evaluation during a later search operation, the found memorandum, provided its score is below a pre-specified threshold, is given preference in the order of succession of the output.

In a further embodiment, a pointer to the recording of the former search command, additionally to the pointer to the memorandum, is stored together with the evaluation of the user for recording the current search command.

An additional refinement of the search function extends the search functionality: associations. The equipment unit searches for the keywords contained in the search command.

If it finds the searched keywords in a former search command or in a memorandum, and it the former search command or the speech memorandum contains further keywords, the equipment unit queries by means of reproduction of these keywords if the search operation is to be extended by these keywords.

In a further refinement, only such keywords are inquired for, which occur repeatedly in several search commands or memorandums as found.

In the preferential embodiment, those speech patterns are first reproduced which have the most frequent occurrence.

The user can then extend the list of the speech patterns to be searched by these patterns, ignore the patterns or exclude from reproduction those speech memorandums which contain these speech patterns. With this function, two things are possible: the quantity of the found speech memorandums can be successively restricted, and theme-related recordings can be found.

In order to accelerate the search in comprehensive recordings, the equipment unit can generate and file a list with keywords and pointers to speech memorandums in which these keywords occur. Several pointers can exist for each keyword. With several pointers for each keyword, the list for each pointer can contain the score between the keyword (speech pattern) in the index list and the keyword (speech pattern) in the referenced memorandum. For one pointer for each keyword, the score is non-applicable because the speech pattern in the memorandum and in the index list are identical. A special function can be made available to the user, with which he can dictate keywords to each memorandum. As an alternative, all words which are spoken individually (with a distinct pause at the beginning and end of the word) can be automatically taken up into the index list. The generation of this list requires processing resources. For this reason, it is preferentially established when the equipment unit is connected up to an external power supply, such as for example, during the loading of the storage battery or in another equipment unit (server).

In addition, other data can be stored together with the speech information.

An example in this case are image data of a digital camera integrated in the equipment that are stored together with speech memorandums. In this embodiment, the search is performed, as already shown, by means of a comparison of the speech patterns contained in the search command and the stored speech signals. The found memorandums are reproduced with the other stored data. Text data or images are reproduced on a screen, for example. Melodies, music, links can be issued, for example, on websites and E-mails.

A further example is the recording of telephone calls or parts thereof, with or without additional commentaries and telephone numbers. A search can be carried out for keywords, together with telephone numbers and, by means of the associative function described above, for speech patterns of the discussion partner, e.g., after the speech pattern of his name wording sounded at the beginning of the conversation.

For all search operations, time-related limitations can also be used, of course, during the search (between date and time, daytime, weekday, year period etc.) for the limitation of the search area.

In an embodiment of this invention where the input and output equipment unit (mobile phone) is connected up to a remote memory and computational facility by means of a speech or data transmission device, the following additional functional sequences result: offline input, offline search, separate memories with different storage scope, necessity of encryption.

Offline input: for recording of new speech memorandums, it is not necessary to have a communication connection to the remote equipment unit. The information is, for example, buffered, compressed or uncompressed, in a flash memory card. Several memorandums can be collected and transmitted together. The transmission can be performed at times when less expensive connection tariffs are applicable or when the user is otherwise in the vicinity of the second equipment unit, e.g., recording onto a work PC while in the office. Offline search: if the search operation is to be performed on a remote equipment unit, no permanent connection between the two pieces of equipment is necessary. It is sufficient when the search command with the speech patterns, e.g., via IP-package, is transmitted to the remote equipment unit and the result is also is transmitted via IP-package or callback.

It is also possible according to the invention to store speech recordings on various equipment units at the same time. In a typical case, the user has with him an input and output equipment unit in the form of a mobile phone. There, and in a flash memory card, with the presently available memory technology and compression algorithms, speech recordings lasting up to a total time of some hours can be stored. This memory can, for example, contain the most recent recordings (offline input) and the current as well as frequently required memorandums. The recordings in the mobile phone are transmitted periodically (refer to "offline input") to the remote equipment unit. The search operation can take place on the local equipment in the local recordings or on the remote equipment unit.

The remote equipment unit can be a large server made available by a provider, similar to that of speech box (voice mail) services. In this embodiment, an encrypted transmission and an encrypted storage on the server of the provider is particularly important. Methods for the encryption of speech and data are known. At no time should the data be on the server or on the transmission route in an non-encrypted form. The search is performed exclusively in the mobile phone based on the index lists or by means of a search of the keywords and pointers of previous stored search commands. The purpose of the server is entirely the storage of memorandums.

In a further embodiment, the index list or the recording of former search commands can partially be on the server. For this purpose, the index list is divisioned on the basis of hierarchy. The list of former search commands is subdivisioned from timing aspects. Lists with older search commands are on the server. When required, and for searching purposes, the lists are transmitted onto the mobile phone.

The invention will be better understood, as follows, by a more detailed description of a most preferred embodiment. The only FIGURE shows the schematic illustration of a possible communication configuration, as noted above.

In the following description the commands of the user are released by pressing keys. These can also be soft keys. According to the invention, it is also possible to issue the commands by means of speech commands.

Recording: The user presses the RECORD key of a mobile phone 10 and speaks his memorandum into the mobile phone 10. To end the recording, he presses the STOP key. The input of the speech is performed by way of the microphone of the mobile phone 10. The analog speech signals are digitised in an analog digital transformer and conducted into a DSP 11. At that location, the signals are led through a pre-filter (high-pass and low-pass), and finally grouped into segments (in a typical manner, 10 to 20 ms segments). Depending on the applied compression standard, the segments overlap each other (e.g., by 10 ms). A Hamming-Window function is applied to the signal values in the segments-After this, the auto-correlation of the signal values is calculated in the individual segments. From this, the LPC coefficients are calculated. For purposes of compression and storage, these coefficients and the speech signals are further processed in accordance with the pre-specified details of the applied compression standard. For purposes of pattern comparison, the LPC-coefficients, or transformed values (e.g., Cepstrum-coefficients, PARCOR-coefficients) are stored as an integral part of the compressed speech information in a memory card 12. In addition, a date and time mark is stored.

Instead of the use of the LPC-method, other methods for speech compression and pattern recognition can also be applied which, for example, are based on the short-time Fourier analysis or filter banks.

The recording can also be performed by means of a speech-/data transmission 13 on a remote equipment unit, here a computer 14 or a server 15.

Search operation: The user presses the SEARCH-key of the mobile phone 10 and, while keeping the key pressed down, he speaks the keywords he is searching for. The equipment unit 10 searches for corresponding memorandums and reproduces acoustically the first found speech information. For a further search and/or for the issue of the next found memorandums, the user can press the NEXT-key or a key for evaluation (GOOD, WRONG) and then, as required, the NEXT-key. The processing of the speech signals is performed analogously to the description given under "recording". The speech patterns are also stored in the same way. Then, the LPC-parameters or transformed values, e.g., Ceptrum-coefficients, are conducted to the pattern recognition. For pattern recognition, the parameters are grouped to vectors. The individual keywords are composed to groups of vectors. Following this, they are compared with the stored speech information. The adaptation to the varying speech speed of the patterns is effected with the method known as "Dynamic Programming". For each keyword and in each memorandum, the score is determined with reference to the most similar stored pattern. Depending on the setting of the equipment unit, the first memorandum found which contains patterns and whose scores are below a pre-specified threshold value, is issued and the search is continued. In another setting, all recordings are first searched through, the memorandums are sorted out according to their scores and those with the smallest scores are issued first. With each pressing of the NEXT-key, the memorandum with the next lower evaluation is issued. Before the issue of a memorandum, the pointer to this memorandum is added to the recording of the search command. In the same way, evaluations which are put in by the user after listening to the memorandum, are added to the recording of the pointer.

Differences to Speech Recognition Systems

Speech recognition systems are designed for other task assignments. Their purpose is to convert a dictated entry into written form, error-free to the greatest possible extent. In speech recognition systems, speech is mapped onto a pre-specified and generally expandable amount of words or functions. The algorithms are established accordingly. Mapping is performed in several steps. In particular, the final steps differ from the approach according to this invention. They use statistic models (usually Hidden Markov Models) with details on the frequencies of transitions between speech segments (speech sounds or phonemes).

These are partially established by an annoying and tiresome training phase for the user before initial use. With the method according to the invention, no training phase is required before first use. Moreover, the vocabulary (keywords) are not stipulated a priori, but result instead dynamically and automatically during the recording and search operations. A further difference: in the speech recognition system there is only one "correct" mapping for each spoken word, meaning, the one which the user has intended. In the equipment unit according to the invention, any given keyword can have several correct "hits".

The invention being thus described, it will be obvious that the same may be varied in many ways. Such variations are not to be regarded as a departure from the spirit and scope of the invention, and all such modifications as would be obvious to one skilled in the art are intended to be included with in the scope of the following claims.

| Reference Parts List | |
|---|---|
| 10 | Mobile phone |
| 11 | Digital signal processor DSP |
| 12 | Memory card |
| 13 | Speech-/data transmission |
| 14 | Computer |
| 15 | Server |

The invention claimed is:

1. A method for the processing of speech information for the realisation of a speech based memory using at least one of means for input, means for storage, means for acoustical reproduction, means for transmission of speech and data information to other devices and means for searching for one or several speech segments in speech information stored in the means for storage, the method comprising the steps of:
 recording digitally at least one spoken voice memorandum as speech signals in the means for storage;
 transforming speech signals into at least one representation suitable for pattern matching;
 recording at least one search word spoken for search purposes;
 comparing the at least one recorded search word with the digital recordings of the at least one voice memorandum with the means for searching by way of pattern matching;
 determining a score between the speech patterns of the search word and the digital recordings of the at least one voice memorandum on a basis of their parameters; and
 sorting at least a part of the at least one voice memorandum according to the score.

2. The method according to claim 1, wherein speech signals are recorded in a compressed manner.

3. The method according to claim 1 or 2, wherein non-compressed signals are stored in addition to compressed speech information.

4. The method according to claim 1, wherein supplementary speech signals are stored associated with at least one of the recorded voice memorandums.

5. The method according to claim 1, wherein during a search operation, speech patterns are compared with the same data records, which are also used for reproduction purposes.

6. The method according to claim 1, wherein reactions of the user as to results of a search operation are recorded.

7. The method according to claim 1, wherein during search operations, speech patterns of former search commands are searched through, taking into consideration recorded evaluations and indicators.

8. The method according to claim 1, wherein during the reproduction of a found item, the search operation is continued.

9. The method according to claim 1, wherein search algorithms and parameters are optimized on the basis of the recorded patterns and evaluations.

10. The method according to claim 1, wherein storage is performed in an encrypted manner and an access protection is installed.

11. The method according to claim 1, wherein for input of speech signals, a microphone, telephone dictating machine or voice box are used.

12. The method according to claim 1, wherein for reproduction, a headphone or telephone are used.

13. The method according to claim 1, wherein a short-time storage is performed in a mobile phone, and a long-time storage is performed on a server, where data are transmitted between short-time storage and long-time storage periodically r with access to the long-time storage.

14. The method according to claim 1, wherein an index is established in which individual speech patterns are separately filed, the individual speech patterns being provided with at lest one of indicators to recorded voice memorandums and coefficients of coincidences (scores).

15. The method according to claim 14, wherein the index pattern is established by a user by speaking individual words.

16. The method according to claim 14 or 15, wherein the index is established offline.

17. The method according to claim 14, wherein an offline optimization or index generation is carried out when the mobile phone is connected up to the power supply.

18. The method according to claim 14, wherein an offline optimization is carried out on a high-performance computer.

19. The method according to claim 1, wherein search operation is performed with a time indication.

20. The method according to claim 1, wherein data files are recorded with link to at least one of the recorded voice memorandums.

21. A device for processing speech information for realization of a speech based memory comprising:
   input means for speech signals;
   storage means for storing digitally at least one voice memorandum;
   means for transforming speech signals into at least one representation suitable for pattern matching;
   means for searching one or several speech segments in speech information, where the means for searching are arranged
      to compare at least one recorded search word with the digital recordings of the at least one voice memorandum with the means for searching by way of pattern matching,
      to determine a score between the speech patterns of the search word and the digital recordings of the at least one voice memorandum on the basis of their parameters, and
      to sort at least a part of the at least one voice memorandum according to the score; and
   output means for outputting the results of at least one of search and sorting.

22. The device according to claim 21, wherein the device comprises a telecommunication device with a memory card.

23. The device according to claim 22, wherein the device comprises a data processing unit equipped with a special additional software.

24. The device according to the claim 21, wherein the device comprises a computer with speech input means and speech output means, where the computer is equipped with special software.

25. The device according to the claim 21, wherein the device comprises a telecommunication device connected by way of a network to a computer or a special server.

* * * * *